US008725637B2

(12) United States Patent
Bixler et al.

(10) Patent No.: US 8,725,637 B2
(45) Date of Patent: May 13, 2014

(54) METHODS AND SYSTEMS FOR GENERATING INVOICES

(75) Inventors: Matt Bixler, Denver, CO (US); Robert Newton, San Francisco, CA (US); Dean Seifert, Parker, CO (US); Dave Owen, Castle Rock, CO (US); Elizabeth Petri, Littleton, CO (US)

(73) Assignee: The Western Union Company, Englewood, CO (US)

( * ) Notice: Subject to any disclaimer, the term of this patent is extended or adjusted under 35 U.S.C. 154(b) by 774 days.

(21) Appl. No.: 11/864,467

(22) Filed: Sep. 28, 2007

(65) Prior Publication Data

US 2009/0089209 A1    Apr. 2, 2009

(51) Int. Cl.
*G06Q 40/00* (2012.01)
*G06Q 30/04* (2012.01)
*G06Q 20/10* (2012.01)
*G06Q 40/02* (2012.01)

(52) U.S. Cl.
CPC ............... *G06Q 40/00* (2013.01); *G06Q 30/04* (2013.01); *G06Q 20/102* (2013.01); *G06Q 40/02* (2013.01)
USPC .............................................. 705/40; 705/35

(58) Field of Classification Search
CPC ..... G06Q 40/00; G06Q 30/04; G06Q 20/102; G06Q 40/02
USPC .................................................... 705/40, 35
See application file for complete search history.

(56) References Cited

U.S. PATENT DOCUMENTS

| | | | |
|---|---|---|---|
| 5,963,925 A * | 10/1999 | Kolling et al. | 705/40 |
| 6,044,362 A * | 3/2000 | Neely | 705/34 |
| 6,188,993 B1 | 2/2001 | Eng et al. | |
| 6,493,685 B1 | 12/2002 | Ensel et al. | |
| 6,994,251 B2 | 2/2006 | Hansen et al. | |
| 7,069,234 B1 | 6/2006 | Cornelius et al. | |
| 7,117,178 B2 | 10/2006 | Thompson | |
| 7,155,409 B1 | 12/2006 | Stroh | |
| 7,426,492 B1 * | 9/2008 | Bishop et al. | 705/39 |
| 7,809,615 B2 * | 10/2010 | Hui et al. | 705/34 |
| 2002/0107796 A1 | 8/2002 | Nakai | |
| 2002/0116334 A1 | 8/2002 | Bennett et al. | |
| 2002/0194127 A1 * | 12/2002 | Randell et al. | 705/40 |
| 2002/0195486 A1 * | 12/2002 | Erb et al. | 235/379 |
| 2003/0093373 A1 * | 5/2003 | Smirnoff et al. | 705/40 |
| 2003/0097331 A1 | 5/2003 | Cohen | |
| 2003/0167229 A1 * | 9/2003 | Ludwig et al. | 705/40 |
| 2004/0088261 A1 | 5/2004 | Moore et al. | |
| 2005/0049968 A1 * | 3/2005 | Porter | 705/40 |
| 2005/0262130 A1 | 11/2005 | Mohan | |
| 2005/0283434 A1 | 12/2005 | Hahn-Carlson et al. | |

(Continued)

OTHER PUBLICATIONS

Stern, L. (1992). A dozen ways to guarantee you'll get paid. Home Office Computing, 10(10), 38. Retrieved Dec. 20, 2013.*

*Primary Examiner* — Kito R Robinson
(74) *Attorney, Agent, or Firm* — Kilpatrick Townsend & Stockton, LLP (57) ABSTRACT

This disclosure describes, generally, methods and systems for generating electronic invoices. The method may include logging on to an online invoicing service account, and looking up a customer account from multiple customers associated with the online invoicing service account. The method may further include selecting the customer account that has a pending financial transaction with a biller. A request for an electronic invoice to be generated for the selected customer is initiated and the electronic invoice may be transmitted to the selected customer.

19 Claims, 5 Drawing Sheets

(56) References Cited

U.S. PATENT DOCUMENTS

| | | |
|---|---|---|
| 2007/0016489 A1 | 1/2007 | Hansen et al. |
| 2007/0100711 A1 | 5/2007 | Stroh |
| 2007/0118472 A1 | 5/2007 | Allen-Rouman et al. |
| 2008/0033851 A1* | 2/2008 | Williams et al. ............... 705/34 |
| 2009/0006250 A1 | 1/2009 | Bixler et al. |
| 2009/0089209 A1 | 4/2009 | Bixler et al. |

* cited by examiner

METHODS AND SYSTEMS FOR GENERATING INVOICES

FIELD OF THE INVENTION

The present invention relates, in general, to invoice generation, and more particularly, to automated generation of electronic invoices and automated notification of the generated invoice.

BACKGROUND OF THE INVENTION

Presently, many businesses engaged in international transactions experience a variety of billing and payment failures. These failures are, in part, a result of using an ad hoc, decentralized method for billing and payment (e.g., telephone conversations, faxes, conventional mail, emails, etc.). These methods can result in invoices not being received or being significantly delayed. Payments may be delayed due to the cumbersome process of manually generating invoices and/or failed delivery or misplacement of invoices.

Additional problems that may arise from current billing and payment methods could be disputes and misunderstandings due to a lack of billing documentation. Current methods also create extra work because of the manual billing process which is not integrated with online payment and accounting systems or integrated with cash payment systems. Furthermore, manual reconstruction of billing and payment history is often required in order to create an audit trail. Accordingly, these and other problems and shortcomings with current methods and systems are overcome by the present invention.

BRIEF SUMMARY OF THE INVENTION

The tools provided by various embodiments of the invention include, without limitation, methods, systems, and/or software products. Mainly by way of example, a method might comprise one or more procedures, any or all of which are executed by a computer system. Correspondingly, an embodiment might comprise a computer system configured with instructions to perform one or more procedures in accordance with methods of the invention. Similarly, a computer program might comprise a set of instructions that are executable by a computer system (and/or a processor therein) to perform such operations. In many cases, such software programs are encoded on physical and/or tangible computer readable media (such as, merely by way of example, optical media, magnetic media, and/or the like).

In one embodiment, a method of generating electronic invoices is described. The method may include logging on to an online invoicing service account and looking up a customer account from multiple customers associated with the online invoicing service account. The method may further include selecting the customer account that has a pending financial transaction with a biller. A request for an electronic invoice to be generated for the selected customer is initiated and the electronic invoice may be transmitted to the selected customer.

In a further embodiment, a system for generating electronic invoices is described. The system may include an online invoicing service center which may be configured to look up a customer account from a plurality of customers associated with an online invoicing service account. The online invoicing service center may further be configured to select the customer account. The selected customer account has a pending financial transaction with a biller. The online invoicing service center may further be configured to generate an electronic invoice for the selected customer and transmit the electronic invoice to the selected customer. The system may further include a computing device coupled with the online invoicing service center. The computing device may be configured to log on to the online invoicing service account and access services related to the online invoicing service account.

In yet another embodiment, a machine-readable medium for generating electronic invoices is described. The machine-readable medium may include instructions for logging on to an online invoicing service account and looking up a customer account from multiple customers associated with the online invoicing service account. The machine-readable medium may further include instructions for selecting the customer account that has a pending financial transaction with a biller. A request for an electronic invoice to be generated for the selected customer is initiated and the electronic invoice may be transmitted to the selected customer.

BRIEF DESCRIPTION OF THE DRAWINGS

A further understanding of the nature and advantages of the present invention may be realized by reference to the remaining portions of the specification and the drawings wherein like reference numerals are used throughout the several drawings to refer to similar components. In some instances, a sub-label is associated with a reference numeral to denote one of multiple similar components. When reference is made to a reference numeral without specification to an existing sub-label, it is intended to refer to all such multiple similar components.

DETAILED DESCRIPTION OF THE INVENTION

While various aspects of embodiments of the invention have been summarized above, the following detailed description illustrates exemplary embodiments in further detail to enable one of skill in the art to practice the invention. In the following description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form. Several embodiments of the invention are described below, and while various features are ascribed to different embodiments, it should be appreciated that the features described with respect to one embodiment may be incorporated with another embodiment as well. By the same token, however, no single feature or features of any described embodiment should be considered essential to the invention, as other embodiments of the invention may omit such features.

Aspects of the present invention relate to an integrated and centralized electronic invoice generation and tracking system. A seller may send a large number of invoices (e.g., over 100) in a given month to a large number of locations in different countries. The ability to generate such invoices automatically and electronically can save a significant amount of time, effort and money. In addition, manually keeping track of the status of each invoice can be almost impossible; as such, having a centralized tracking and reporting system for all outstanding and/or closed invoices available in a centralized location can greatly improve the process of collecting on unpaid invoices.

Furthermore, because the invoices can be sent to customers electronically, the notification process is much more streamlined. A customer, for example, may receive an invoice via an email account permitting the customer to quickly and easily pay the invoice through an electronic funds transfer (EFT), a wire transfer, a credit card payment, etc. The seller can then receive payment confirmation almost instantly after the invoice has been paid. Consequently, business transactions for both sellers and buyers are greatly improved and all involved are able to save a significant amount of time and money.

Figure 1:
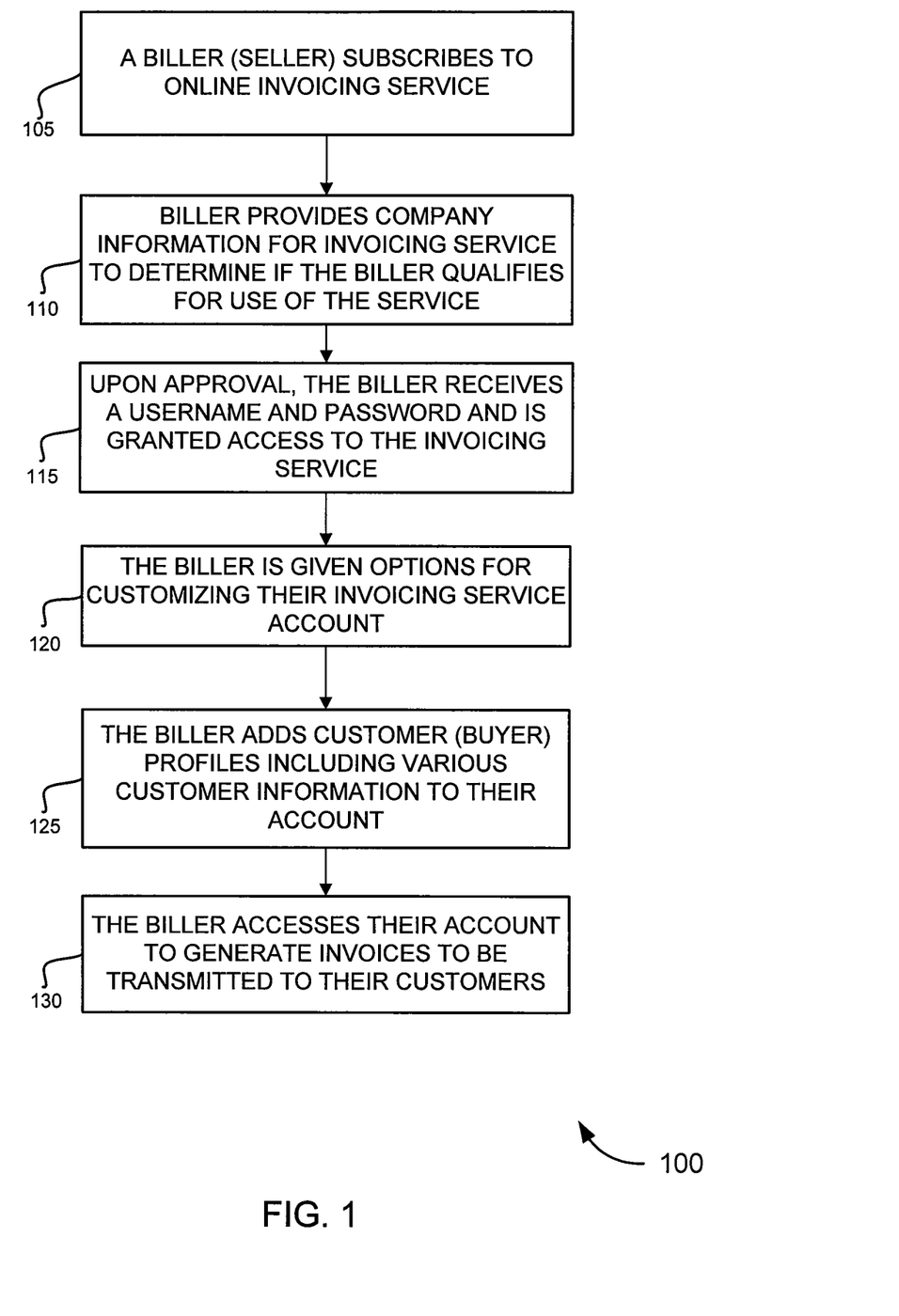
FIG. 1 is a flow diagram illustrating a method of registering an account with an online electronic invoice generation service, in accordance with various embodiments of the invention.

FIG. 1 illustrates a flow diagram of a method 100 for registering an account with an online electronic invoice generation service in accordance with various embodiments of the invention. At process block 105, a biller (or seller) may subscribe to an invoicing service. In one embodiment, the invoicing service may be online as such the invoicing service may be accessed through a website.

In a further embodiment, the invoicing service may be integrated with a comprehensive financial service. Additional services in the comprehensive financial service may include financial tracking and reporting as described in U.S. Provisional Application No. 60/946,344 entitled "TRACKING AND REPORTING FINANCIAL TRANSACTION SYSTEMS AND METHODS", filed on Jun. 26, 2007, which is incorporated by reference in its entirety for any purpose. The comprehensive financial service may also include the financial services described in U.S. Provisional Application No. 60/946,341, entitled "CONSOLIDATED PAYMENT OPTIONS", filed on Jun. 26, 2007, which is incorporated by reference in its entirety for any purpose. In a further embodiment, the comprehensive financial service may be Global Business Payments™ service from The Western Union Company of Englewood, Colo.

At process block 110, in order for the biller to subscribe to the invoicing service, the biller may need to provide information related to the biller's company. The information may include, for example, the corporate or trade name, address and other contact information (e.g., telephone number, fax number, etc.), and business history information, (e.g., date established, years in business, number of employees, etc.). Information about the business principles may also need to be provided. For example, names and contact information for the owner or owners of the business may need to be provided.

Additional information about the business' background may be needed. Such information may include the business' financial history (e.g., has the company ever declared bankruptcy, has the company ever been refused lending, does the company have any outstanding liens, etc.), or the business type (e.g., goods sold or services rendered, local or international transactions, etc.). Furthermore, the business may need to provide government regulatory compliance information required to meet Anti Money Laundering (AML) and Know Your Customer (KYC) regulations.

In one embodiment, such information may be used to determine if the biller and/or biller's company qualify for the invoicing service. In some instances, the invoicing service may not offer the service to certain business types or businesses that may have currently or in the past participated in illegal activities. Further, some businesses may not have sufficient financial stability to be subscribed to the service.

At process block 115, upon approval of the biller and/or biller's company, the biller may then be granted access to the invoicing service. In one embodiment, as part of the approval process, the biller may be given a username and password, which may be used to logon to the online service. In an alternative embodiment, the biller may select their username and password or may be able to change the username and password after logging on to the online service. In one embodiment, the website for the online service may implement various security protocols (e.g., encryption, system logon registrations, password expirations, etc.).

In a further embodiment, the biller may be able to access the website 24 hours a day, 7 days a week. Accordingly, the biller is able to keep track of pending invoices and initiate new invoices at their continence. Billers are no longer constrained by postal hours, billing service hours, location restrictions, etc. A biller can ultimately manage their invoicing from anywhere they can obtain access to the Internet. In the alternative, a biller at, for example, at a trade show or other such event may broker a deal without Internet access, and thus does not have the ability to access the invoicing service to add the new buyer and/or transaction to their account. Nonetheless, the biller may alternatively call into a customer service center or send a facsimile (fax) to the invoicing service provider and provide the new buyer profile and/or transaction information which is to be added to their invoicing service account.

At process block 120, after the biller has logged on to their account, they may be able to customize their invoicing service account. For example, the biller may add bank account information to be associated with the invoice service account. In one embodiment, the biller may add multiple bank accounts (e.g., one account in Germany for European transactions, on account in China for Asia area transactions, one in the United States for North American transactions, etc.). The different bank accounts may have different currency and, as such, payments of the currency type may be transferred to the corresponding bank account. The biller may have certain bank accounts for different transaction types (e.g., one account for payments from subcontractors, one account for payments from distributors, one escrow account, etc.).

In one embodiment, the biller may be able to further customize the invoicing service to connect with various accounting software programs (e.g., Quicken®, QuickBooks®, Microsoft® Money, etc.). In one embodiment, the accounting software may be connected to the invoicing service account in such a way that automatic reconciliation and/or updating of the accounting software records may be preformed. For example, the biller may schedule an updating time (e.g., weekly) in which all of the newly closed invoices since the last update are updated into the accounting software records. In an alternative embodiment, the biller may be able to export the contents of the invoicing account into a file (e.g., a text document, a Microsoft® Excel spreadsheet, a tab delineated document, etc.). The file may then be used to update the accounting software records.

At process block 125, the biller may add customers (or buyers) into their online invoicing account. For example, the biller/seller located in the United States may conduct business (e.g., selling auto part supplies) with a customer/buyer in Mexico. In one embodiment, the biller may desire to enter the buyer's information into, for example, a buyer's profile. The information might include contact information (e.g., phone numbers, fax numbers, email addresses, billing addresses, etc.), financial information (bank account information, credit account information, etc.), and other information needed to generate invoices to send to the buyer. The buyer information may further include target language information (the language in which correspondence to the buyer should be) and target currency type information (e.g., Euros, Dollars, Yen, etc.). The biller may further add additional customer profiles to the invoicing service resulting in the biller being able to perform all of their invoicing in one centralized location. The biller may also be able to enter personal notes and/or observations into a buyer's profile. Alternatively, a seller may not store the buyer's profile information within the seller's account. In contrast, the buyer may be able to manage their own profile as enrolled in the invoicing service and choose to pay the invoice through the service via their own account.

At process block 130, the biller may access their account in order to generate invoices to be transmitted to the biller's customers. In one embodiment, the biller may be able to access any of the customers that they have entered into their invoicing service account by selecting, for example, a drop-down menu. The biller may also be able to filter invoices by customer, date, amount, etc. In a further embodiment, some of the customers may also subscribe to the invoicing service. As such, the customers may be able to receive invoices directly into their own invoicing service account, and the customers may become "billers" and send out their own invoices.

In a further embodiment, the biller/seller may schedule reoccurring or partial invoices with certain customers/buyers. For example, the seller may have entered into a contract to sell 100 widgets per month to the buyer for 12 months with the balance due on the $15^{th}$ of each month. Accordingly, the seller may schedule a reoccurring invoice to be generated and transmitted to the buyer on the $5^{th}$ th of each month. The invoice may be dynamically generated to reflect changes to, for example, pricing. If, in the contract, the price for the widgets was agreed to be based on a widgets governing body's pricing, then the invoice service would automatically access the governing body and insert the appropriate price. Furthermore, the pricing may need to reflect current exchange rates; as such, the invoice would gather the exchange rate information and calculate the appropriate pricing. Also, the invoice may be configured to include a service or other type of fee.

In one embodiment, a partial invoice may be generated for a particular customer. For example, a purchase order may be opened for an offshore construction project in which the purchase order's total balance due is $100,000. The terms of the purchase order may be that the buyer is required to pay 20% of the total every 60 days. Thus, a partial invoice may then be generated for $20,000 dollars and transmitted to the buyer. After 60 days another invoice for $20,000 may be transmitted. As the partial invoices are paid, the total balance due for the purchase order may be decremented to reflect the current balance. The seller may then be able to track the status of the purchase order, check for overdue or delinquent purchase orders, send out reminders, etc.

Figure 2:
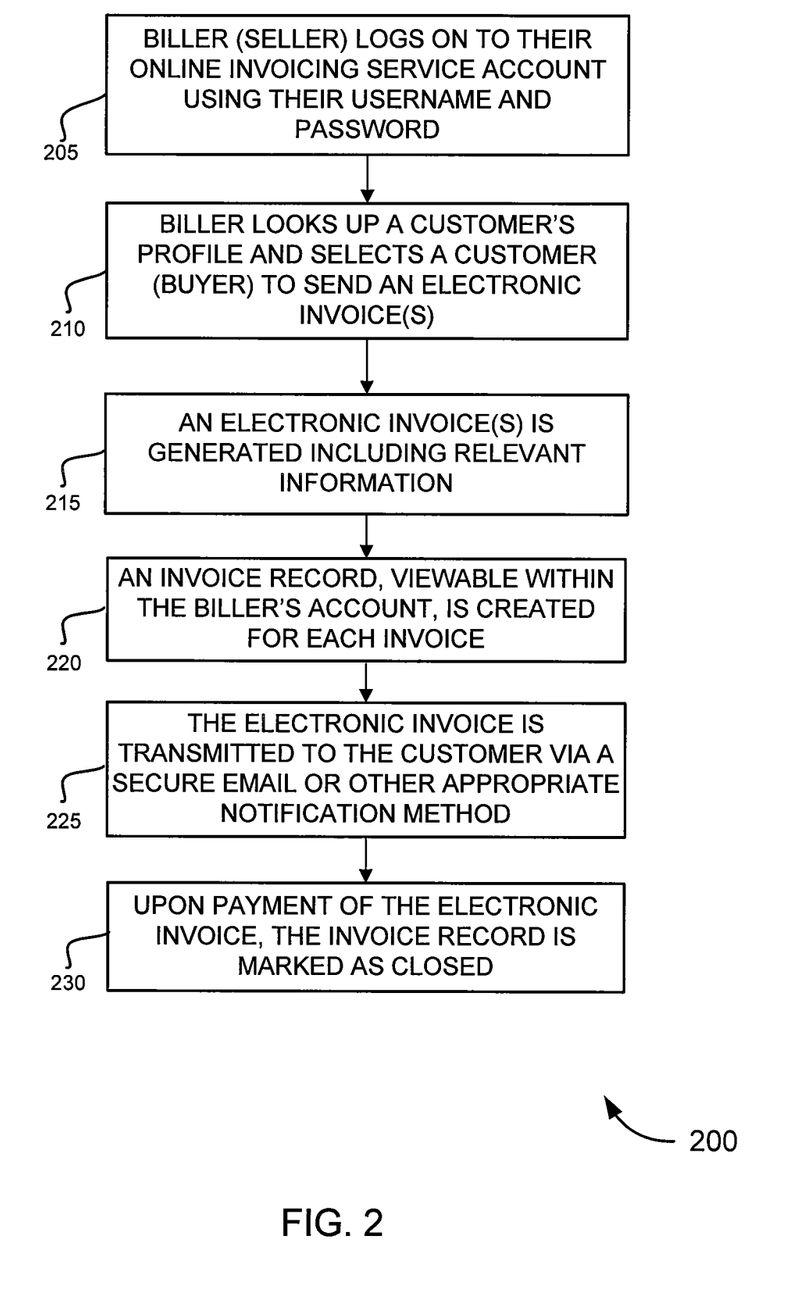
FIG. 2 is a flow diagram illustrating a method of generating electronic invoices, in accordance with various embodiments of the invention.

Turning now to FIG. 2 which illustrates a method 200 of generating electronic invoices, in accordance with various embodiments of the invention. At process block 205, using the user name and password associated with the biller's online invoicing account, the biller may log on to their account. The biller may log on to their account via an internet browser by entering the universal resource locator (URL) of the invoicing service website into the address box of the browser. The biller may access the website via a personal computer, mobile device, portable device, etc. Alternatively, if the biller is unable to access the website the biller can access the invoicing service via a call center, a fax, etc.

At process block 210, the biller may look up a customer profile and select the customer in which to transmit an electronic invoice. The biller may select multiple customer profiles and generate multiple invoices using batch processing. The biller may begin the invoice generation process for a customer(s) and, after partial completion of the process, save their progress for completion at a later time.

At process block 215, an electronic invoice may be generated, in one embodiment, based on information provided from the customer profile, customization data provided by the biller, and other additional information. The biller may be able to select from various invoice templates provided through the invoicing service account. The biller may also select a "free form" invoice template which may allow the biller to completely customize each aspect of the invoice. For example, the biller may be able to customize the background color, font, font size, etc. Furthermore, the biller may be able to insert a custom logo onto the invoice, or have a watermark (i.e., for security and/or identification purposes) placed within the invoice. The biller may also be able to upload additional templates to their account.

In a further embodiment, the biller may be able to insert notes and/or special instructions into the invoice. The electronic invoices may be transmitted in a variety of formats. For example, the invoices may be in the format of PDF, postscript, Microsoft® Word, text, etc. Accordingly, the electronic invoices may be stored by both biller and buyer on a computer storage device for subsequent retrieval.

In yet a further embodiment, the electronic invoice may include an integrated currency conversion calculator. For example, upon receipt of the invoice, the buyer may click on a hyperlink embedded in the invoice which may popup a currency conversion calculator or may open a browser to a website with a currency conversion calculator. The buyer may then enter the invoice balance amount, the current and target currency types and receive up-to-date currency conversion information. In addition to currency conversion, the invoice may also be generated in a variety of target languages. Accordingly, when the buyer receives the invoice it is already in the appropriate language.

In an alternative embodiment, the biller may have the invoice generated in their own language (e.g., English) and prior to the buyer receiving the invoice it may be processed through a translation mechanism such that when the buyer receives the invoice, it will be in the buyer's language (e.g., Japanese). The translation may occur using a set of dictionaries which correspond to each language. The electronic invoice may be parsed and each word/sentence may be translated by accessing the dictionaries. One of ordinary skill in the art would appreciate that other translation mechanisms may be used. In addition, the translation may also support ASCI language character sets (e.g., Japanese, Chinese, Arabic, etc.).

The electronic invoices may further include attachments. For example, a photograph of the product or legal documents which may be required by government and regulatory entities may be attached to the invoice. Additionally, the invoice may include an embedded hyperlink in order for the buyer to pay the balance of the invoice. The hyperlink may open a browser to a URL associated with the online invoicing service which presents the buyer with payment options. For example, the buyer may be able to pay the invoice with a credit card, bank account, wire transfer, etc. In the alternative or in addition, if the buyer has an account with the online invoicing service, the hyperlink may transfer the buyer into their account.

In a further embodiment, the invoice may be sent to the buyer via fax or a mail service. As such, the invoice may include a URL or other locating instrument which the buyer may use to pay the invoice. The invoice may also include a confirmation number or invoice number in order for the buyer to properly identify to the online invoicing service which invoice they are attempting to pay. The buyer may also be able to pay the invoice by telephone or fax.

One aspect of the present invention provides billers with added security of financial information. For example, instead of a biller needing to send to a buyer their bank account information in order to receive payment of an invoice, the buyer pays the invoice through the online invoicing service. As a result, the biller's bank account information is not disclosed to buyers and thus remains secure and confidential. There remains one level of separation between the biller's financial information and the buyer. The same is true for the buyer such that the buyer's financial information may also be kept secure and confidential from the biller.

At process block 220, an invoice record may be created for each invoice that is generated. The invoice record may be viewable by the biller within their online invoicing service account. In one embodiment, the invoice records may be stored and archived to maintain an invoice history. The invoice records may also be used to check the status of pending invoices. For example, the biller may check to determine whether an invoice has been received by the buyer, is paid, is past due, etc.

In a further embodiment, the invoice records may be used for reporting purposes. For example, the biller may be able to set options which allow automatic notices to be sent to buyers with invoice balances that are past due by a certain amount of time. The notices may be based on a tier system, where an initial notice is scheduled to automatically be sent out at 30 days past due, 60 days, 90 days, etc. In addition to the notices, a past due fee may be automatically included in the balance due on the invoice. In another embodiment, if the invoice balance is not paid after a certain amount of time and/or a number of notices sent out, the invoicing service could automatically initiate a collection or other such action against the buyer. In one embodiment, notices sent out to buyers may be in email form, by fax, regular mail, text messages, short message system (SMS), voicemail, etc.

In an additional embodiment, the invoice records and history data may be used to send out additional notifications between buyers and sellers. For example, upon full payment of an invoice balance, the invoicing service may automatically send out a thank you message to the buyer. Alternatively, a message could be sent to the biller with a buyer's contact information included, which indicates that the biller should call or send a message to the buyer thanking them for their business, updating the buyer on new goods or services the biller has to offer, etc.

In one embodiment, the invoicing service may include a more robust customer relation management (CRM) component. The history data may be used to rate customers based on, for example, their payment record, their volume, their longevity, etc. The higher the rating of a customer ultimately the higher potential value that customer is to the seller. As a result, automatic messages and other correspondence may be generated and sent out to various customers based on their rating. For example, if the invoicing service determines that a customer has, in the past, had a high purchase volume (e.g., 100 units per month), and has now dropped off significantly (e.g., 5 units per month), then the invoicing service may send out a coupon or other incentive mechanism to attempt to increase the customer's business.

At process block 225, the electronic invoice may be transmitted to the appropriate buyer. In one embodiment, the invoice is transmitted via a secure email to the buyer; however, other transmission methods may be used. For example, the invoice may be transmitted to the buyer using SMS, regular mail, fax, etc. The buyer may also receive a voicemail message indicating that they have a new invoice available for viewing, in transit, etc. In one embodiment, the transport method used is secured through encryption.

At process block 230, upon payment of an invoice balance, the invoice record associated with that invoice may be marked or designated as "closed." The designation may be changing the color of the record, bolding the record, flagging the record, etc. In one embodiment, closed records may be moved to a different location for viewing by the biller. Consequently, the biller is able to know the status of all invoices within their invoicing service account at a glance.

Figure 3:
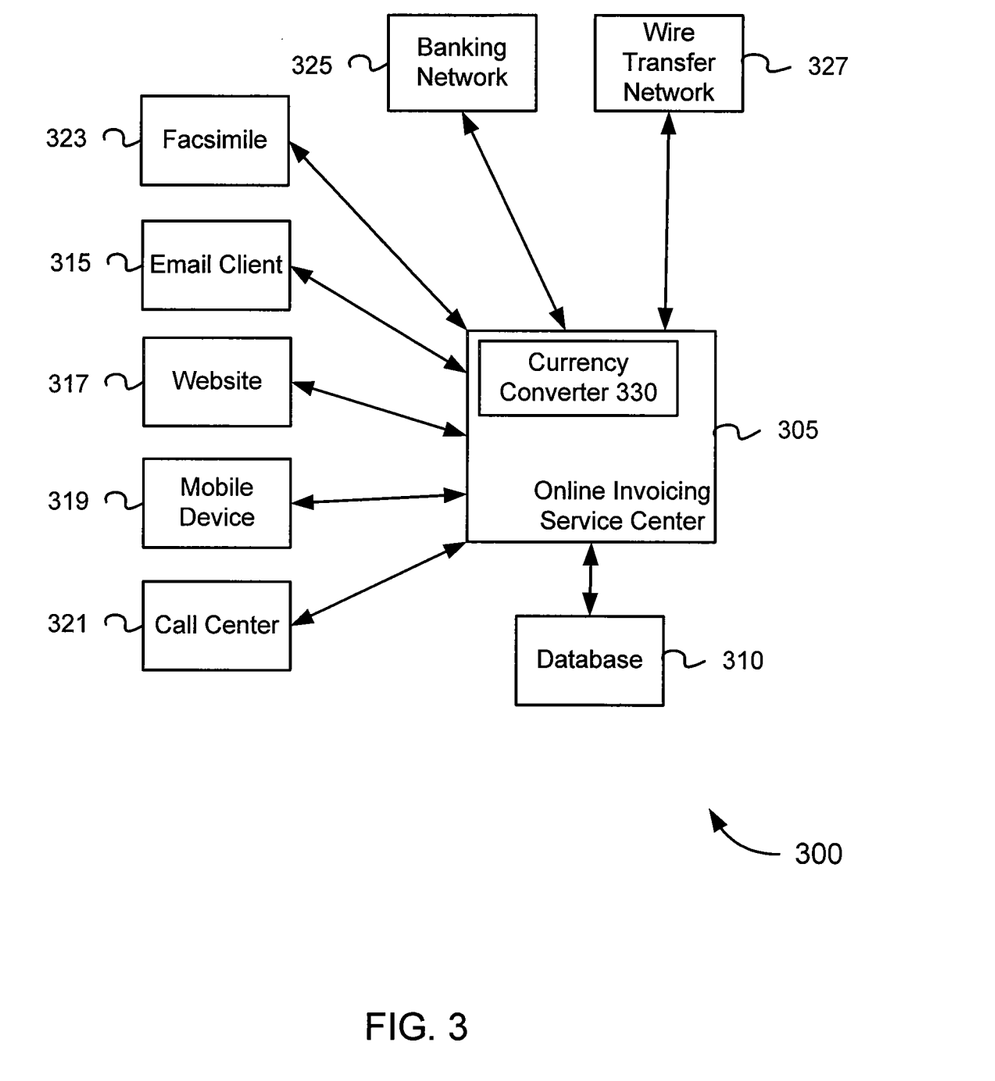
FIG. 3 is a block diagram illustrating a system for implementing the methods in FIGS. 1 and 2, in accordance with various embodiments of the invention.

FIG. 3 illustrates a system 300 for implementing the methods described in FIGS. 1 and 2, in accordance with various embodiments of the invention. In one embodiment, system 300 may include an online invoicing service center 305. Online invoicing service center 305 may be configured to implement the operations of the invoicing service described above with respect to FIGS. 1 and 2. For example, online invoicing service center 305 may generate electronic invoices, send out notices to customers, track payment status of pending invoices, transmit generated invoices to customers, etc.

In a further embodiment, system 300 may include a database 310 connected to online invoicing service center 305. Database 310 may store invoice history and tracking data. In one embodiment, online invoicing service center 305 may forward data related to invoice status to database 310, which stores and organizes the data for retrieval upon request by online invoicing service center 305. Database 310 may further be used to provide data for responding to various reporting requests.

System 300 may further include an email client 315, a website 317, a mobile device 319, a call center 321, and a facsimile 323 connected to online invoicing service center 305. In one embodiment, email client 315 may send and receive emails which include electronic invoices and/or messages generated or received by online invoicing service center 305. Website 317 may present a biller with login capabilities to their online invoicing service account and may provide the biller with invoice generation and tracking capabilities. Furthermore, mobile device 319 may send and/or receive messages (e.g., text messages, SMS, etc.) or invoices generated by online invoicing service center 305. In addition, call center 321 and/or facsimile 323 may receive new buyer information from billers, new invoice generation requests, payments from buyers, etc. when, for example, the buyer and/or the seller do not have access to the Internet or other network.

In a further embodiment, system 300 may include banking network 325 and wire transfer network 327. Banking network 325 may be connected with online invoicing service center 305 in order to receive invoice payments to be deposited into a biller's bank account. In addition, buyers who are subscribers to the online invoicing service may be able to pay invoice balances with their bank accounts through banking network 325 to online invoicing service center 305. Furthermore, wire transfer network 327 may allow billers to receive wire transfer invoice payments and may allow buyers to pay invoice balances by wire transfer through online invoicing service center 305. In one embodiment, invoicing service center 305 may further include a currency converter 330 to convert currency. For example, a biller may receive an invoice payment using a currency other than their own currency. Thus, currency converter can convert the foreign currency into the biller's currency without the biller being aware of the conversion.

Figure 4:
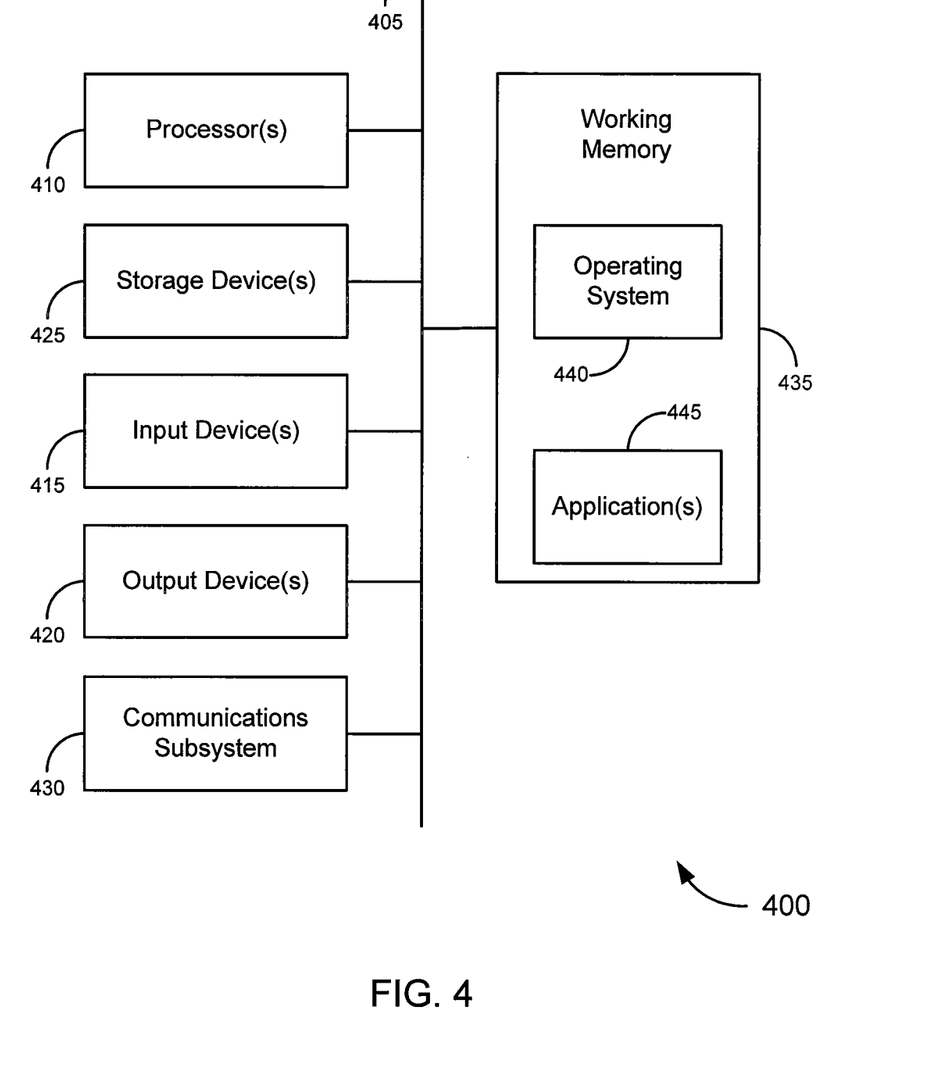
FIG. 4 is a generalized schematic diagram illustrating a computer system, in accordance with various embodiments of the invention.

FIG. 4 provides a schematic illustration of one embodiment of a computer system 400 that can perform the methods of the invention, as described herein, and/or can function as, for example, online invoicing service center 305 (FIG. 3). It should be noted that FIG. 4 is meant only to provide a generalized illustration of various components, any or all of which may be utilized as appropriate. FIG. 4, therefore, broadly illustrates how individual system elements may be implemented in a relatively separated or relatively more integrated manner.

The computer system 400 is shown comprising hardware elements that can be electrically coupled via a bus 405 (or may otherwise be in communication, as appropriate). The hardware elements can include one or more processors 410, including without limitation one or more general-purpose processors and/or one or more special-purpose processors (such as digital signal processing chips, graphics acceleration chips, and/or the like); one or more input devices 415, which can include without limitation a mouse, a keyboard and/or the like; and one or more output devices 420, which can include without limitation a display device, a printer and/or the like.

The computer system 400 may further include (and/or be in communication with) one or more storage devices 425, which can comprise, without limitation, local and/or network accessible storage and/or can include, without limitation, a disk drive, a drive array, an optical storage device, solid-state storage device such as a random access memory ("RAM") and/or a read only memory ("ROM"), which can be programmable, flash-updateable and/or the like. The computer system 400 might also include a communications subsystem 430, which can include without limitation a modem, a network card (wireless or wired), an infra-red communication device, a wireless communication device and/or chipset (such as a Bluetooth™ device, an 802.11 device, a WiFi device, a WiMax device, cellular communication facilities, etc.), and/or the like. The communications subsystem 430 may permit data to be exchanged with a network (such as the network described below, to name one example), and/or any other devices described herein. In many embodiments, the computer system 400 will further comprise a working memory 435, which can include a RAM or ROM device, as described above.

The computer system 400 also can comprise software elements, shown as being currently located within the working memory 435, including an operating system 440 and/or other code, such as one or more application programs 445, which may comprise computer programs of the invention, and/or may be designed to implement methods of the invention and/or configure systems of the invention, as described herein. Merely by way of example, one or more procedures described with respect to the method(s) discussed above might be implemented as code and/or instructions executable by a computer (and/or a processor within a computer). A set of these instructions and/or code might be stored on a computer readable storage medium, such as the storage device(s) 425 described above. In some cases, the storage medium might be incorporated within a computer system, such as the system 400. In other embodiments, the storage medium might be separate from a computer system (i.e., a removable medium, such as a compact disc, etc.), and or provided in an installation package, such that the storage medium can be used to program a general purpose computer with the instructions/code stored thereon. These instructions might take the form of executable code, which is executable by the computer system 400 and/or might take the form of source and/or installable code, which, upon compilation and/or installation on the computer system 400 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

In one aspect, the invention employs a computer system (such as the computer system 400) to perform methods of the invention. According to a set of embodiments, some or all of the procedures of such methods are performed by the computer system 400 in response to processor 410 executing one or more sequences of one or more instructions (which might be incorporated into the operating system 440 and/or other code, such as an application program 445) contained in the working memory 435. Such instructions may be read into the working memory 435 from another machine-readable medium, such as one or more of the storage device(s) 425. Merely by way of example, execution of the sequences of instructions contained in the working memory 435 might cause the processor(s) 410 to perform one or more procedures of the methods described herein.

The terms "machine-readable medium" and "computer readable medium", as used herein, refer to any medium that participates in providing data that causes a machine to operate in a specific fashion. In an embodiment implemented using the computer system 400, various machine-readable media might be involved in providing instructions/code to processor(s) 410 for execution and/or might be used to store and/or carry such instructions/code (e.g., as signals). In many implementations, a computer readable medium is a physical and/or tangible storage medium. Such a medium may take many forms, including but not limited to, non-volatile media, volatile media, and transmission media. Non-volatile media includes, for example, optical or magnetic disks, such as the storage device(s) 425. Volatile media includes, without limitation, dynamic memory, such as the working memory 435. Transmission media includes coaxial cables, copper wire and fiber optics, including the wires that comprise the bus 405, as well as the various components of the communication subsystem 430 (and/or the media by which the communications subsystem 430 provides communication with other devices). Hence, transmission media can also take the form of waves (including without limitation radio, acoustic and/or light waves, such as those generated during radio-wave and infrared data communications).

Common forms of physical and/or tangible computer readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, an EPROM, a FLASH-EPROM, any other memory chip or cartridge, a carrier wave as described hereinafter, or any other medium from which a computer can read instructions and/or code.

Various forms of machine-readable media may be involved in carrying one or more sequences of one or more instructions to the processor(s) 410 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 400. These signals, which might be in the form of electromagnetic signals, acoustic signals, optical signals and/or the like, are all examples of carrier waves on which instructions can be encoded, in accordance with various embodiments of the invention.

The communications subsystem 430 (and/or components thereof) generally will receive the signals, and the bus 405 then might carry the signals (and/or the data, instructions, etc., carried by the signals) to the working memory 435, from which the processor(s) 410 retrieves and executes the instructions. The instructions received by the working memory 435 may optionally be stored on a storage device 425 either before or after execution by the processor(s) 410.

Figure 5:
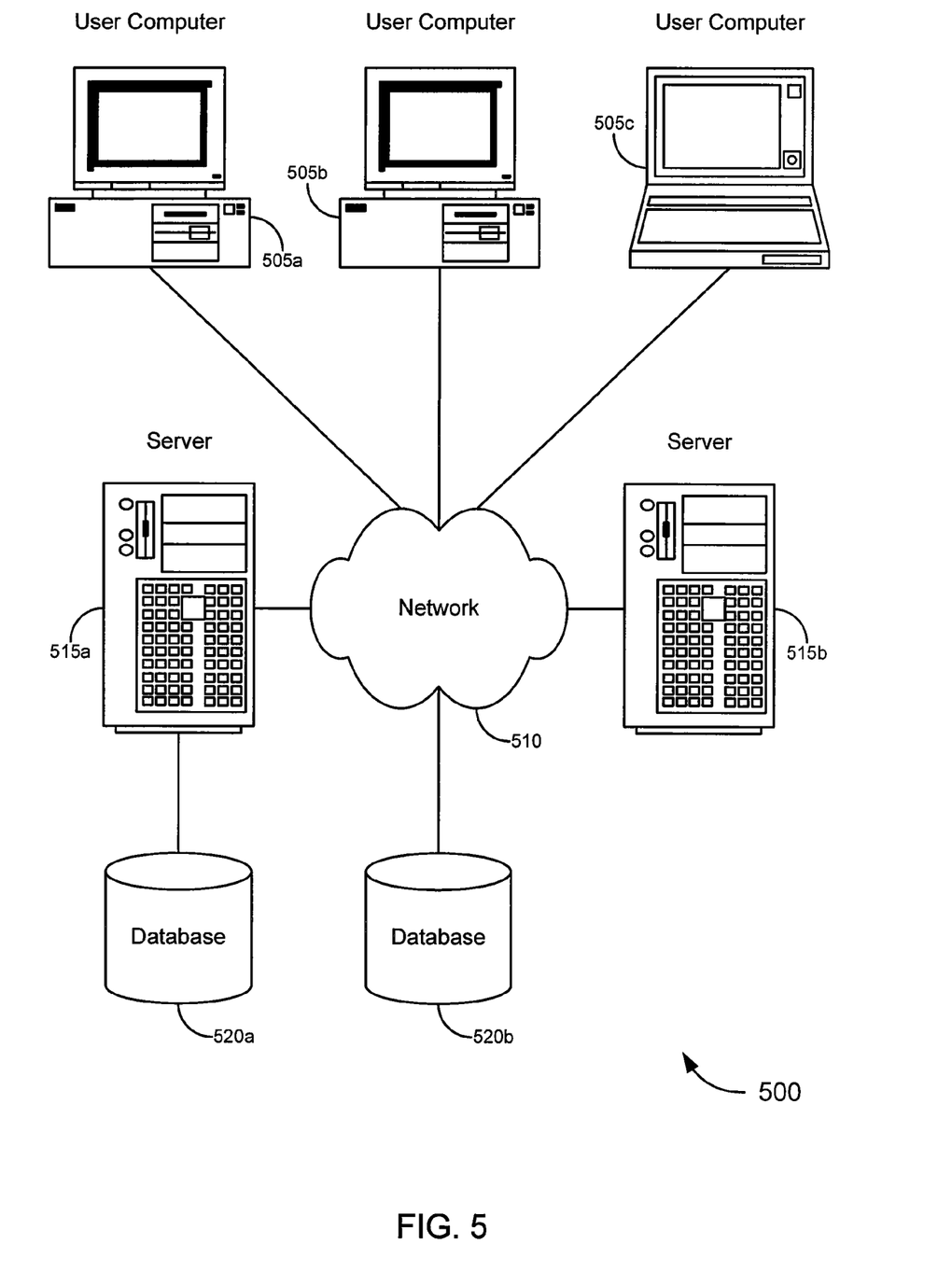
FIG. 5 is a block diagram illustrating a networked system of computers, which can be used in accordance with various embodiments of the invention.

A set of embodiments comprises systems for generating electronic invoices. Merely by way of example, FIG. 5 illustrates a schematic diagram of a system 500 that can be used in accordance with one set of embodiments. The system 500 can include one or more user computers 505. The user computers 505 can be general purpose personal computers (including, merely by way of example, personal computers and/or laptop computers running any appropriate flavor of Microsoft Corp.'s Windows® and/or Apple Corp.'s Macintosh® operating systems) and/or workstation computers running any of a variety of commercially-available UNIX™ or UNIX-like operating systems. These user computers 505 can also have any of a variety of applications, including one or more applications configured to perform methods of the invention, as well as one or more office applications, database client and/or server applications, and web browser applications. Alternatively, the user computers 505 can be any other electronic device, such as a thin-client computer, Internet-enabled mobile telephone, and/or personal digital assistant (PDA), capable of communicating via a network (e.g., the network 510 described below) and/or displaying and navigating web pages or other types of electronic documents. Although the exemplary system 500 is shown with three user computers 505, any number of user computers can be supported.

Certain embodiments of the invention operate in a networked environment, which can include a network 510. The network 510 can be any type of network familiar to those skilled in the art that can support data communications using any of a variety of commercially-available protocols, including without limitation TCP/IP, SNA, IPX, AppleTalk, and the like. Merely by way of example, the network 510 can be a local area network ("LAN"), including without limitation an Ethernet network, a Token-Ring network and/or the like; a wide-area network (WAN); a virtual network, including without limitation a virtual private network ("VPN"); the Internet; an intranet; an extranet; a public switched telephone network ("PSTN"); an infra-red network; a wireless network, including without limitation a network operating under any of the IEEE 802.11 suite of protocols, the Bluetooth™ protocol known in the art, and/or any other wireless protocol; and/or any combination of these and/or other networks.

Embodiments of the invention can include one or more servers 515. Each of the servers 515 may be configured with an operating system, including without limitation any of those discussed above, as well as any commercially (or freely) available server operating systems. Each of the servers 515 may also be running one or more applications, which can be configured to provide services to one or more clients 505 and/or other servers 515.

Merely by way of example, one of the servers 515 may be a web server, which can be used, merely by way of example, to process requests for web pages or other electronic documents from user computers 505. The web server can also run a variety of server applications, including HTTP servers, FTP servers, CGI servers, database servers, Java® servers, and the like. In some embodiments of the invention, the web server may be configured to serve web pages that can be operated within a web browser on one or more of the user computers 505 to perform methods of the invention.

The servers 515, in some embodiments, might include one or more application servers, which can include one or more applications accessible by a client running on one or more of the client computers 505 and/or other servers 515. Merely by way of example, the server(s) 515 can be one or more general purpose computers capable of executing programs or scripts in response to the user computers 505 and/or other servers 515, including without limitation web applications (which might, in some cases, be configured to perform methods of the invention). Merely by way of example, a web application can be implemented as one or more scripts or programs written in any suitable programming language, such as Java®, C, C#® or C++, and/or any scripting language, such as Perl, Python, or TCL, as well as combinations of any programming/scripting languages. The application server(s) can also include database servers, including without limitation those commercially available from Oracle®, Microsoft®, Sybase®, IBM® and the like, which can process requests from clients (including, depending on the configuration, database clients, API clients, web browsers, etc.) running on a user computer 505 and/or another server 515. In some embodiments, an application server can create web pages dynamically for displaying the information in accordance with embodiments of the invention, such as the information included in the online invoicing service webpage. Data provided by an application server may be formatted as web pages (comprising HTML, Javascript, etc., for example) and/or may be forwarded to a user computer 505 via a web server (as described above, for example). Similarly, a web server might receive web page requests and/or input data from a user computer 505 and/or forward the web page requests and/or input data to an application server. In some cases a web server may be integrated with an application server.

In accordance with further embodiments, one or more servers 515 can function as a file server and/or can include one or more of the files (e.g., application code, data files, etc.) necessary to implement methods of the invention incorporated by an application running on a user computer 505 and/or another server 515. Alternatively, as those skilled in the art will appreciate, a file server can include all necessary files, allowing such an application to be invoked remotely by a user computer 505 and/or server 515. It should be noted that the functions described with respect to various servers herein (e.g., application server, database server, web server, file server, etc.) can be performed by a single server and/or a plurality of specialized servers, depending on implementation-specific needs and parameters.

In certain embodiments, the system can include one or more databases 520. The location of the database(s) 520 is discretionary: merely by way of example, a database 520a might reside on a storage medium local to (and/or resident in) a server 515 a (and/or a user computer 505). Alternatively, a database 520 b can be remote from any or all of the computers 505, 515, so long as it can be in communication (e.g., via the network 510) with one or more of these. In a particular set of embodiments, a database 520 can reside in a storage-area network ("SAN") familiar to those skilled in the art. (Likewise, any necessary files for performing the functions attributed to the computers 505, 515 can be stored locally on the respective computer and/or remotely, as appropriate.) In one set of embodiments, the database 520 can be a relational database, such as an Oracle® database, that is adapted to store, update, and retrieve data in response to SQL-formatted commands. The database might be controlled and/or maintained by a database server, as described above, for example.

While the invention has been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods of the invention are not limited to any particular structural and/or functional architecture but instead can be implemented on any suitable hardware, firmware and/or software configuration. Similarly, while various functionality is ascribed to certain system components, unless the context dictates otherwise, this functionality can be distributed among various other system components in accordance with different embodiments of the invention.

Moreover, while the procedures comprised in the methods and processes described herein are described in a particular order for ease of description, unless the context dictates otherwise, various procedures may be reordered, added, and/or omitted in accordance with various embodiments of the invention. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary features, the various components and/or features described herein with respect to a particular embodiment can be substituted, added and/or subtracted from among other described embodiments, unless the context dictates otherwise. Consequently, although the invention has been described with respect to exemplary embodiments, it will be appreciated that the invention is intended to cover all modifications and equivalents within the scope of the following claims.

What is claimed is:

1. A method of generating electronic invoices, the method comprising:
   receiving, at an invoicing service system, a request from a biller to register with the invoicing service system, wherein the biller is a company, and the request includes:
      an indication of a number of years the company has been in business;
      an indication of a number of employees within the company;
      an indication of whether the company has ever declared bankruptcy;
      an indication of whether the company has ever been refused lending; and
      an indication of whether the company has any outstanding liens;
   determining, with the invoicing service system, whether to register the biller, based at least in part on the number of years the company has been in business, the number of employees within the company, whether the company has ever declared bankruptcy, whether the company has ever been refused lending, and whether the company has any outstanding liens;
   registering the biller with the invoicing service system by establishing an online invoicing service account for the biller, based upon a positive determination to register the biller;
   receiving a request to log on to the online invoicing service account running on the invoicing service system, wherein the invoicing service system includes an integrated and centralized view of each of a plurality of customer accounts associated with the biller;
   tracking, by the invoicing service system, each of the plurality of customer accounts associated with the online invoicing service account;
   determining, by the invoicing service system, each of the plurality of customer accounts that have at least one pending financial transaction with the biller;
   automatically generating, by the invoicing service system and without any user interaction, electronic invoices for each of the at least one pending financial transactions of each of the plurality of customers; and
   prior to transmitting each of the plurality of electronic invoices, determining the location of each of the corresponding customers;
   based on the determined locations, identifying an associated language for each of the locations and translating each of the electronic invoices into the associated language of each of the plurality of invoices;
   transmitting, by the invoicing service system, each of the electronic invoices to the each of the corresponding customers, wherein the biller's online invoicing service account is associated with one or more of the biller's bank accounts, and the electronic invoices are transmitted to the customers including deposit or transfer options for the customers to transfer or deposit funds in payment of the electronic invoices into the one or more of the biller's bank accounts, without disclosing account information from the one or more of the biller's bank accounts by the customers paying the invoices through the invoicing service system, wherein one level of separation is maintained between the one or more of the biller's bank accounts and the customers.

2. The method of claim 1, further comprising prior to the biller logging on to the online invoicing service account, subscribing to the online invoicing service account.

3. The method of claim 2, wherein the subscribing further comprises:
   providing company information of the biller to the online invoicing service; and
   upon approval based on the provided company information, receiving a username and password granting access to the online invoicing service to the biller.

4. The method of claim 3, wherein the company information includes at least one of company type, company financial status, company name, company contact information, and company's governmental regulation compliance status.

5. The method of claim 1, wherein the biller is a seller and the plurality of customers are buyers.

6. The method of claim 1, wherein at least one of the plurality of customers has an online invoicing service account.

7. The method of claim 6, wherein if a customer is registered with the online invoicing service, receiving the electronic invoice from the biller via the customer's online invoicing service account.

8. The method of claim 7, wherein the customer's online invoicing service account is associated with one or more bank accounts, wherein the one or more bank accounts are configured to pay an amount of the electronic invoice.

9. The method of claim 1, wherein the electronic invoice includes at least one of a hyperlink configured for paying the electronic invoice, an attached document, a universal resource locator (URL) configured for paying the electronic invoice, a confirmation identifier, and interactive currency conversion.

10. The method of claim 9, further comprising customizing the electronic invoice by using at least one of an uploaded invoice template, a customized logo, a customized background, a customized watermark, a customized language, and a customized format.

11. The method of claim 1, further comprising transmitting at least one of an invoice notice and the electronic invoice to the customer by at least one of an email, a text message, a facsimile, electronic facsimile, and a mail service.

12. The method of claim 1, further comprising establishing the electronic invoice as a reoccurring invoice, wherein reoccurrence of the electronic invoice is based on an amount of time.

13. The method of claim 1, wherein the electronic invoice is a partial invoice with an associated balanced, wherein subsequent partial invoices are transmitted to the selected customer until the balance is paid.

14. The method of claim 1, further comprising:
maintaining a record of transactions associated with the biller's online invoicing service account; and
exporting the record of transaction to a financial accounting software program.

15. The method of claim 1, further comprising:
maintaining, within the biller's online invoicing service account, a list of unpaid invoices, wherein the electronic invoice transmitted to the selected customer is included within the list of unpaid invoices;
receiving a notification that the selected customer has paid a balance of the electronic invoice; and
removing the electronic invoice from the list of unpaid invoices.

16. The method of claim 15, wherein the balance of the electronic invoice is paid using at least one of a wire transfer network, cash, a check, and a credit card.

17. The method of claim 1, further comprising automatically generating reminder notice for delinquent invoice payments, wherein the reminder notices are incrementally scheduled based on a duration of the delinquency.

18. A non-transitory machine-readable medium having sets of instructions stored thereon which, when executed by a machine, cause the machine to:
registering a biller with the invoicing service system by establishing an online invoicing service account for the biller;
associating, with the online invoicing service account, a plurality of bank account identifiers, wherein each of the plurality of bank account identifiers is associated with a bank account at a bank in a different country;
receive a request to log on to an online invoicing service account configured to provide a centralized view of each of a plurality of invoices, wherein the invoicing service account includes an integrated and centralized view of each of a plurality of customer accounts associated with a biller;
track each of the plurality of customer accounts associated with the online invoicing service account;
determine each of the plurality of customer accounts have at least one pending financial transaction with the biller;
automatically generate and without any user interaction electronic invoices for each of the at least one pending financial transactions of each of the plurality of customers;
prior to transmitting each of the plurality of electronic invoices, determining the location of each of the corresponding customers;
based on the determined locations, identifying an associated language for each of the locations and translating each of the electronic invoices into the associated language of each of the plurality of invoices;
based on the determined locations, associating each of the plurality of electronic invoices with a bank identifier associated with the biller's bank in the country of the determined location;
transmit each of the electronic invoices to the each of the corresponding customers, wherein the electronic invoices are transmitted to the customer including deposit or transfer options for the customer to transfer or deposit funds in payment of the electronic invoice into the biller's bank in the country of the customer, as previously associated with the electronic invoice, without disclosing account information from the one or more of the biller's bank accounts; and
dynamically update the centralized view in response to receiving payments to the electronic invoice.

19. A system for generating electronic invoices, the system comprising:
a memory storage device; and
a processor in communication with the memory storage device, wherein the memory storage device includes set of instructions stored thereon which, when executed by the processor, cause the processor to:
receive a request to log on to an online invoicing service account running on an invoicing service system, wherein the invoicing service system includes an integrated and centralized view of each of a plurality of customer accounts associated with a biller;
track, by the invoicing service system, each of the plurality of customer accounts associated with the online invoicing service account;
track, by the invoicing service system, history data on each of the plurality of customer accounts, wherein the history data includes:
past payments of the customer;
past payment volume of the customer;
longevity of payment history;
rating, by the invoicing service system, each of the plurality of customer accounts, based at least on the history data, to determine the value of each customer to the biller;
determine, by the invoicing service system, based at least upon the ratings for each of the plurality of customer accounts, that a coupon should be provided to at least a subset of the plurality of customers;
generate, by the invoicing service system, the coupon for each of the subset of the plurality of customers;
determine, by the invoicing service system, each of the plurality of customer accounts that have at least one pending financial transaction with the biller;

automatically generate, by the invoicing service system and without any user interaction, electronic invoices for each of the at least one pending financial transactions of each of the plurality of customers;

prior to transmitting each of the plurality of electronic invoices, determining the location of each of the corresponding customers;

based on the determined locations, identifying an associated language for each of the locations and translating each of the electronic invoices into the associated language of each of the plurality of invoices;

transmit, by the invoicing service system, each of the electronic invoices to the each of the corresponding customers, wherein the biller's online invoicing service account is associated with one or more of the biller's bank accounts, and the electronic invoices are transmitted to the customers including deposit or transfer options for the customers to transfer or deposit funds in payment of the electronic invoices into the one or more of the biller's bank accounts, without disclosing account information from the one or more of the biller's bank accounts by the customers paying the invoices through the invoicing service system, wherein one level of separation is maintained between the one or more of the biller's bank accounts and the customers; and transmit, by the invoicing service system, each of the generated coupons to each of the subset of the plurality of customers.

* * * * *